July 8, 1958 D. G. GREW 2,841,947
CUCUMBER HARVESTING MACHINE
Filed July 25, 1955 11 Sheets-Sheet 1

INVENTOR.
DOLPHIS G. GREW
BY
Christy, Parmelee & Strickland
HIS ATTORNEYS

July 8, 1958 D. G. GREW 2,841,947
CUCUMBER HARVESTING MACHINE
Filed July 25, 1955 11 Sheets-Sheet 2

INVENTOR.
DOLPHIS G. GREW
BY
Christy, Parmelee & Strickland
HIS ATTORNEYS

July 8, 1958 D. G. GREW 2,841,947
CUCUMBER HARVESTING MACHINE
Filed July 25, 1955 11 Sheets-Sheet 5
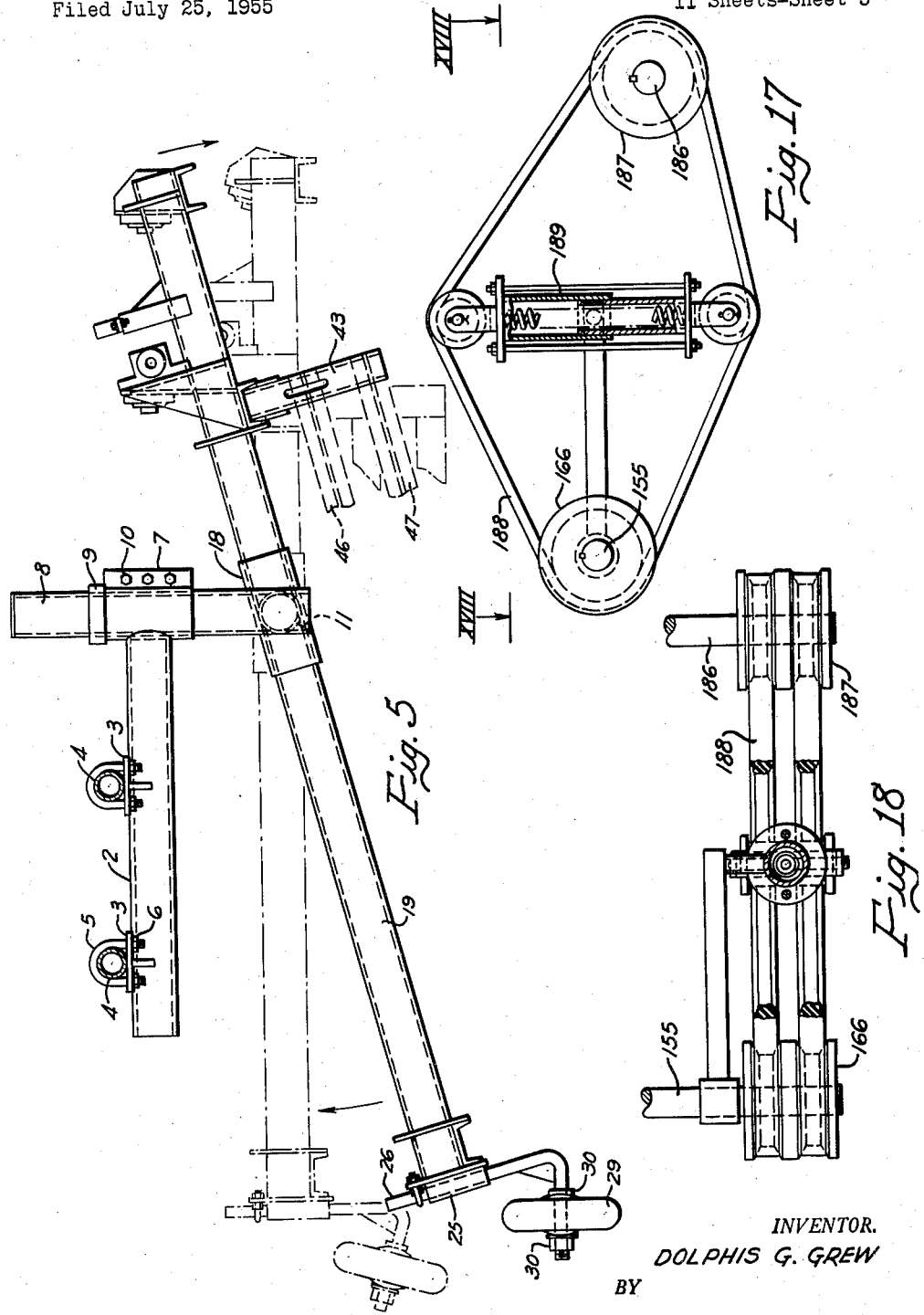
INVENTOR.
DOLPHIS G. GREW
BY
Christy, Parmelee & Strickland
HIS ATTORNEYS July 8, 1958
D. G. GREW
2,841,947
CUCUMBER HARVESTING MACHINE
Filed July 25, 1955
11 Sheets-Sheet 6
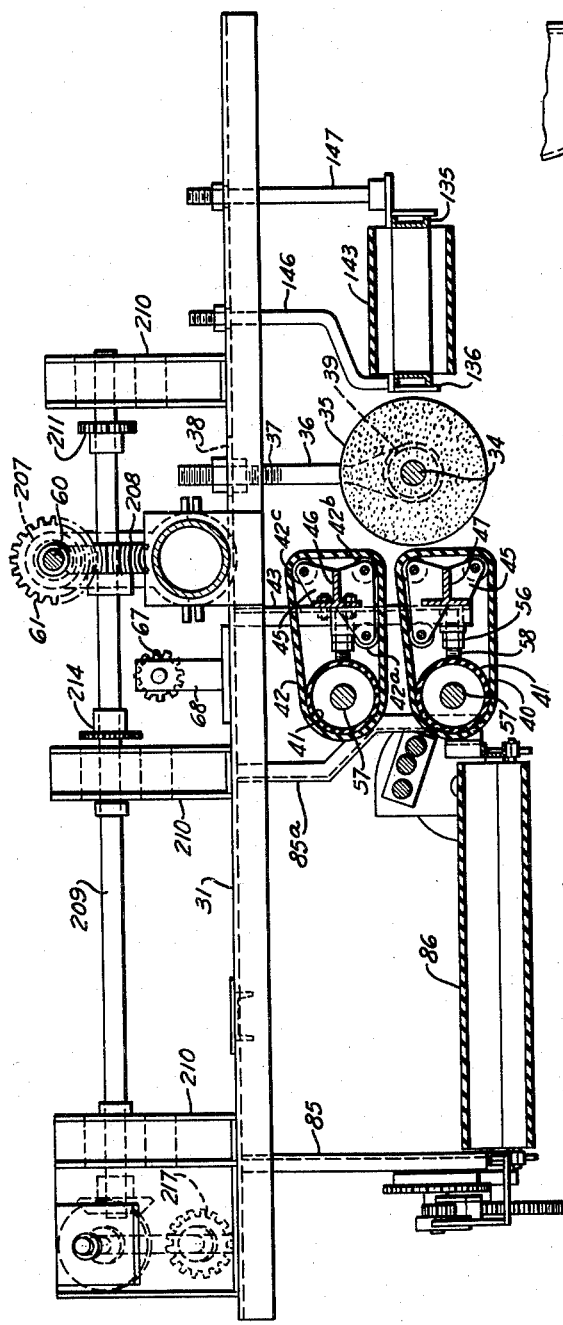
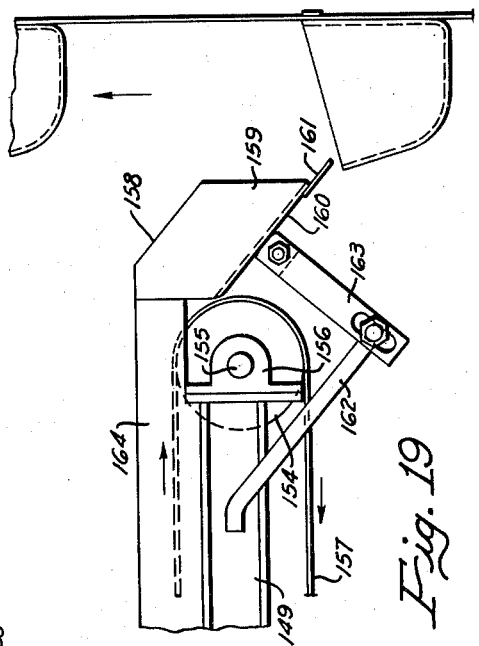
INVENTOR.
DOLPHIS G. GREW
BY
Christy, Parmelee & Strickland
HIS ATTORNEYS July 8, 1958     D. G. GREW     2,841,947
CUCUMBER HARVESTING MACHINE
Filed July 25, 1955     11 Sheets-Sheet 7
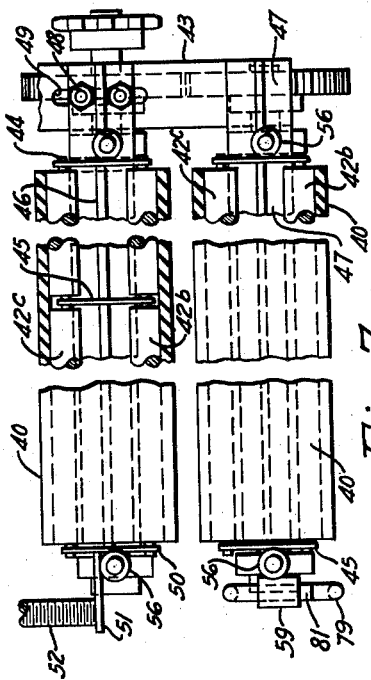
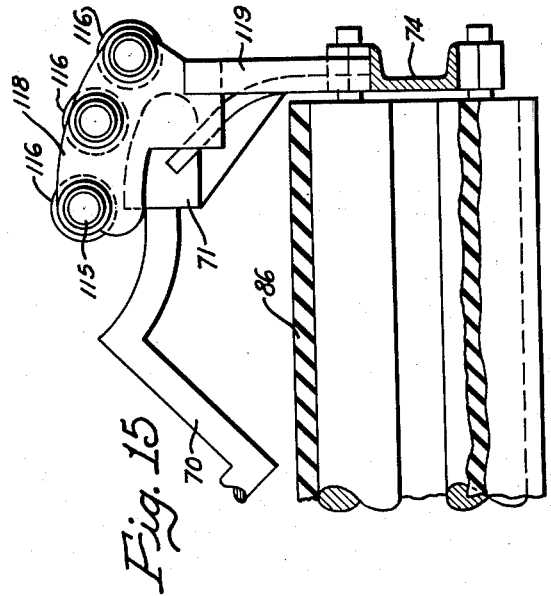
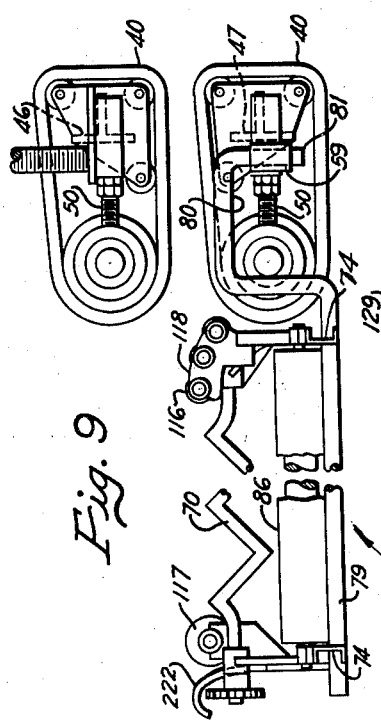
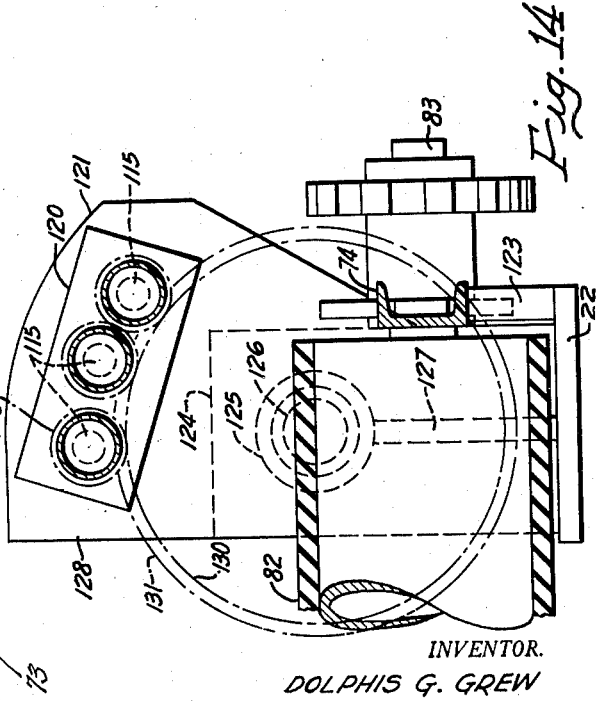
INVENTOR.
DOLPHIS G. GREW
BY
Christy, Parmelee & Strickland
HIS ATTORNEYS July 8, 1958     D. G. GREW     2,841,947
CUCUMBER HARVESTING MACHINE
Filed July 25, 1955     11 Sheets-Sheet 8
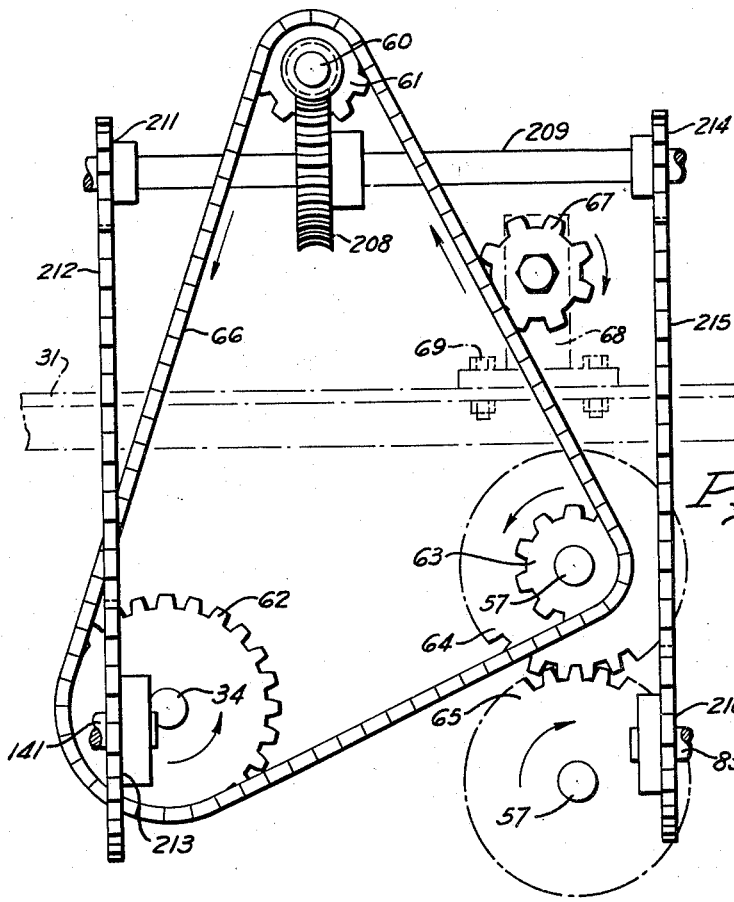
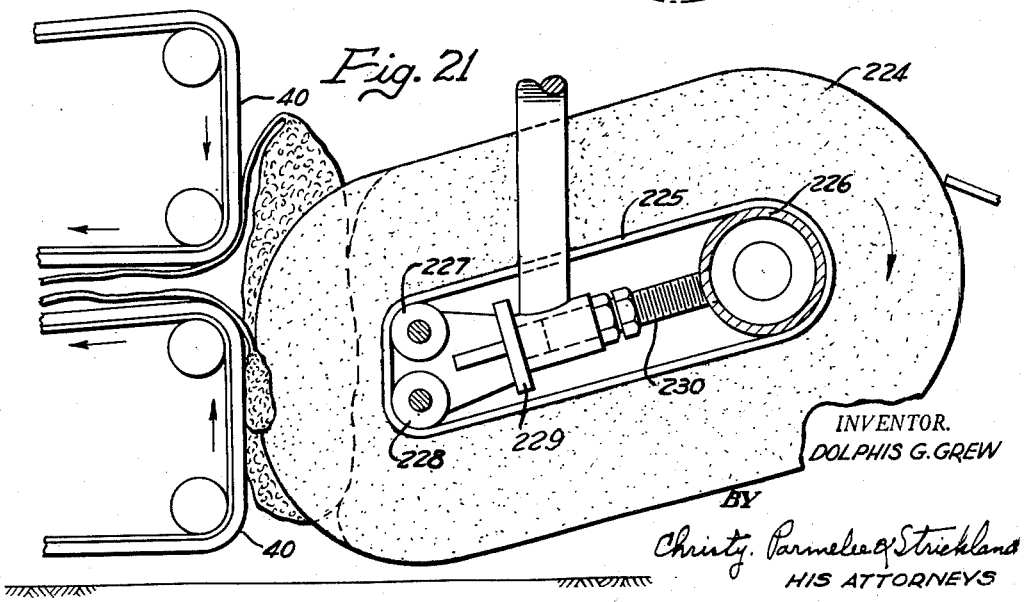
INVENTOR.
DOLPHIS G. GREW
BY
Christy, Parmelee & Strickland
HIS ATTORNEYS July 8, 1958

D. G. GREW 2,841,947

CUCUMBER HARVESTING MACHINE

Filed July 25, 1955

INVENTOR.
DOLPHIS G. GREW
BY
Christy, Parmelee & Strickland
HIS ATTORNEYS

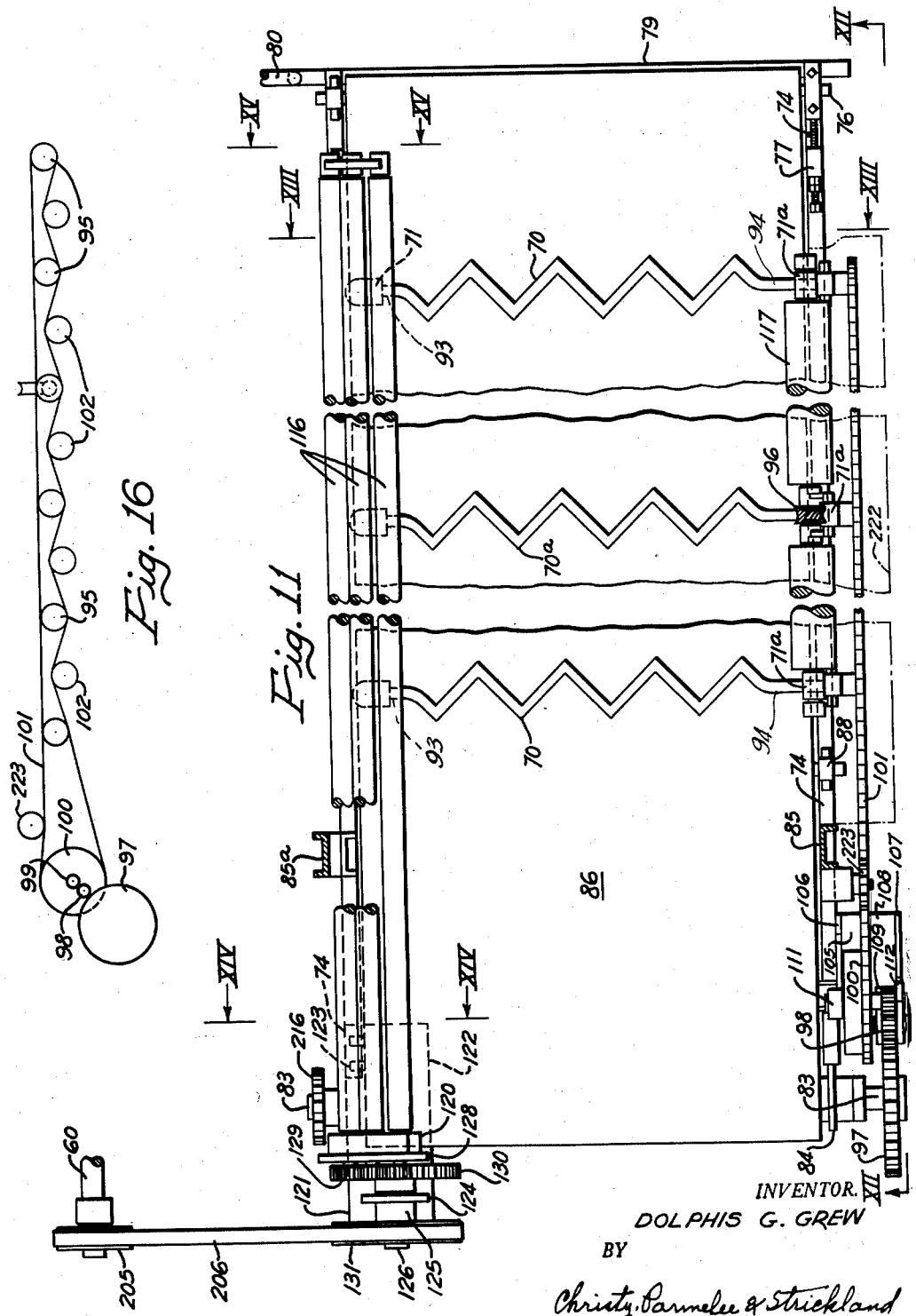

July 8, 1958
D. G. GREW
2,841,947
CUCUMBER HARVESTING MACHINE
Filed July 25, 1955
11 Sheets-Sheet 11
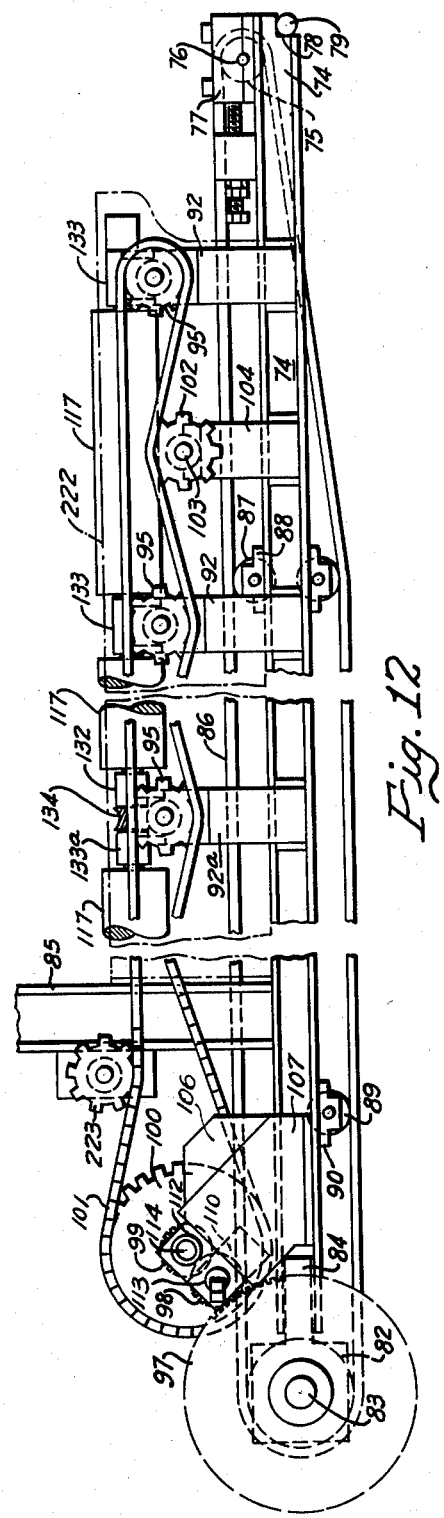
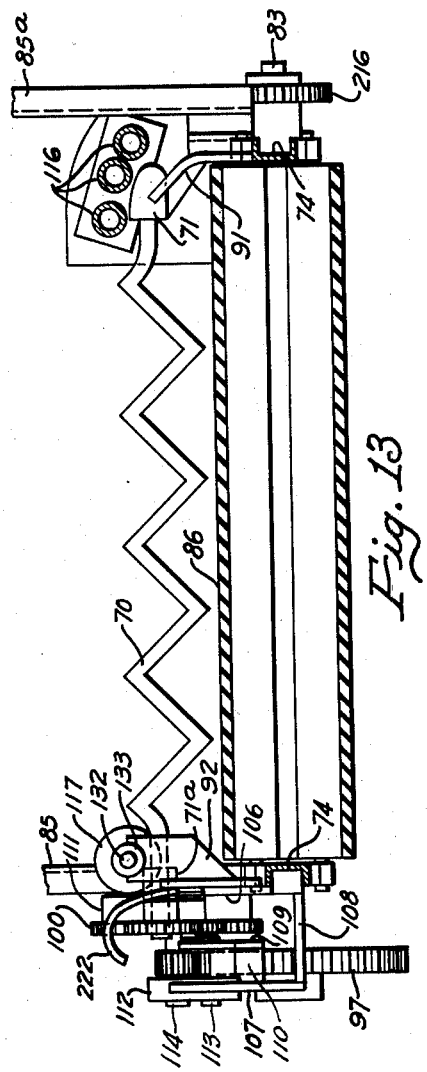
INVENTOR.
DOLPHIS G. GREW
BY
Christy, Parmelee & Strickland
HIS ATTORNEYS

United States Patent Office 2,841,947
Patented July 8, 1958

2,841,947

CUCUMBER HARVESTING MACHINE

Dolphis G. Grew, Saginaw, Mich.

Application July 25, 1955, Serial No. 524,258

30 Claims. (Cl. 56—327)

This invention relates to the mechanized harvesting of cucumbers from growing vines while leaving the vines in good condition to produce and yield additional cucumbers, and is for apparatus for picking the cucumbers of usable size from the vines from time to time as growing conditions may require.

A primary object of my invention is to provide a harvesting machine adapted to be driven through the fields of growing vines, and by a novel method and apparatus, engage the vines, remove and collect the usable fruits of assorted sizes, and replace the vines on the ground without destruction of the vines, blossoms, or freshly set cucumbers of a size too small to be gathered.

A further object of my invention is to provide such a harvesting machine and method which will operate with an efficiency at least comparable to or better than the efficiency of the transient hand labor available for the same purpose.

Another object of the invention is to provide an apparatus of the character described which removes the cucumbers from the growing vines while being driven through a field of such vines.

Another object of the invention is to provide an apparatus which during movement through a field of growing vines, raises the vine from the ground without damage to the roots thereof, severs the cucumbers from the vine, collects the severed cucumbers and returns the vine to the ground for further growing and production of cucumbers.

A further object of the invention is to provide an apparatus of the character described which is selective as to the size of cucumbers which are severed from the growing vine.

These and other objects of the invention will be made apparent as the description proceeds.

During the relatively short growing season, the cucumber vines in a field have fruits in a wide range of sizes and in various stages of development. The usable sizes for commercial pickling purposes range from the smallest gherkins preferably about ⅜" diameter and 1⅛" long, to large cucumbers about 2" in diameter and 6⁹⁄₁₆" in length. The smaller fruits demand a higher price, while cucumbers above the maximum size above indicated are normally in little demand and should be removed from the vines because the fruit is then ripening and robbing the vine of vigor and productiveness. In good growing weather the fruit may develop from the minimum usable size above stated to the maximum size in from 40 to 70 hours.

At the present time imported transient labor, which is in scarce supply, must be relied upon for harvesting the cucumbers. This is not only unreliable and expensive, but it is hard, hot, laborious toil, and since a large grower can scarcely cover the field every forty hours, much fruit will be lost by overdevelopment, especially since the average laborer will miss much of the small fruit because of the leaf growth and the difficulty of seeing the smaller cucumbers.

Cucumber vines are fragile and easily broken and it was long considered that they should not be disturbed very much lest they stop bearing. I have discovered that contrary to general belief, the vines, if properly handled, may be lifted from the ground if the roots be not disturbed, fruits of usable size removed, and the vine placed back on the ground, and its yield will not be seriously impaired, even if the leaves in some cases must reorient themselves when the vine is replaced. My invention therefore contemplates such manipulation of the vines.

Not only must the vines be properly handled, but the stem attaching the fruit to the vine is relatively stronger and less brittle than the vine, so that an axial pull is likely to damage the vine before the fruit is detached. A force applied at right angles to the length of the cucumber will more effectively remove it, and my invention is designed to apply such force, but substantially avoid the breaking or bruising of the fruit.

Also the leaves offer interference to the separation of the fruit from the vine, and yet the vine must be handled in such manner as to impair or damage the leaves as little as possible. My invention provides for the effective shaking of detached fruits out of the mass of leaves and vines.

After much experimentation, I have found that the most efficient method of mechanically picking cucumbers of assorted sizes is to raise the growing end of the vine from the ground, detach the fruits from the vine, and return the vine to the ground for further growth and production. The vines normally grow to lengths of 4 to 6 feet, and unless cultivated will so intermingle on the ground that can not be lifted without considerable damage. To overcome this, I have found it desirable to plant the vines in spaced rows about 6' 6" apart and to space the vines in a row so that they can be trained to grow without densely intermingling. Mechanical training of the growing vines may be resorted to when they reach a length of 2 to 3 feet to encourage straight line growth. Preferably a combing operation is used and such mechanical combing is preferably limited to one such handling of the vines. I have also found it desirable to divide a field lengthwise and train the spaced rows of vines in one half of the field to grow in one direction and the vines in the other half of the field to grow in the opposite direction. The vines may be disced to prevent overlapping of the rows. This permits picking the cucumbers by running the machine down one side of the field and then turning the machine and running the machine down the opposite side of the field in the opposite direction.

During trials of the machine it has been observed that the younger vines and their leaves are more brittle than they are at the middle of the growing season. It has also been observed that when the vines are covered with dew at the beginning of the work day, or when the vines are covered with moisture as from rains, a different handling action is required than when the vines are dry. In the present embodiment of the invention the vine handling portions of the apparatus are readily adjustable to compensate for the varying conditions of the vines.

In the drawings forming part of this disclosure:

Fig. 5 shows a section through the sub-structure taken on lines V—V of Fig. 4 illustrating the manner of raising the harvester from picking position to permit turning or transporting thereof;

Fig. 6 shows an enlarged section through the harvester on lines VI—VI of Fig. 1 illustrating the relation between the vine lifting and shaking mechanisms;

Fig. 7 is an enlarged fragmentary view with parts broken away and shown in section showing support of the secondary rolls from the substructure of Fig. 4;

Fig. 8 is an enlarged view of the drive for the vine lifting rolls;

Fig. 9 is a fragmentary end elevational view showing the relation and support of the rear conveyor and vine shaker upon the vine secondary lifting rolls;

Fig. 11 shows an enlarged fragmentary plan view of the rear conveyor and vine shaker;

Fig. 12 shows a side elevation of the rear conveyor and vine shaker shown in Fig. 11;

Fig. 13 shows a cross-section through the vine shaker and rear conveyor taken on the line XIII—XIII of Fig. 11;

Fig. 14 is an enlarged cross section on lines XIV—XIV of Fig. 11 showing the drive for the vine take-away rolls;

Fig. 15 is a cross section taken on the line XV—XV of Fig. 11 showing an end view of the supporting bracket for the vine take-away rolls and bearing for the vine shaker spirals;

Fig. 16 is a schematic arrangement of the drive for the vine shaker;

Fig. 17 shows an elevational view with parts broken away and shown in section of the belt tightener for the side conveyor drive;

Fig. 18 shows a section taken on lines XVIII—XVIII of Fig. 17;

Fig. 19 shows an enlarged view of a portion of the side conveyor and feed into the elevator boots;

Fig. 21 shows a modification of the vine pick-up rolls and cucumber stem severing mechanisms.

Figure 1:
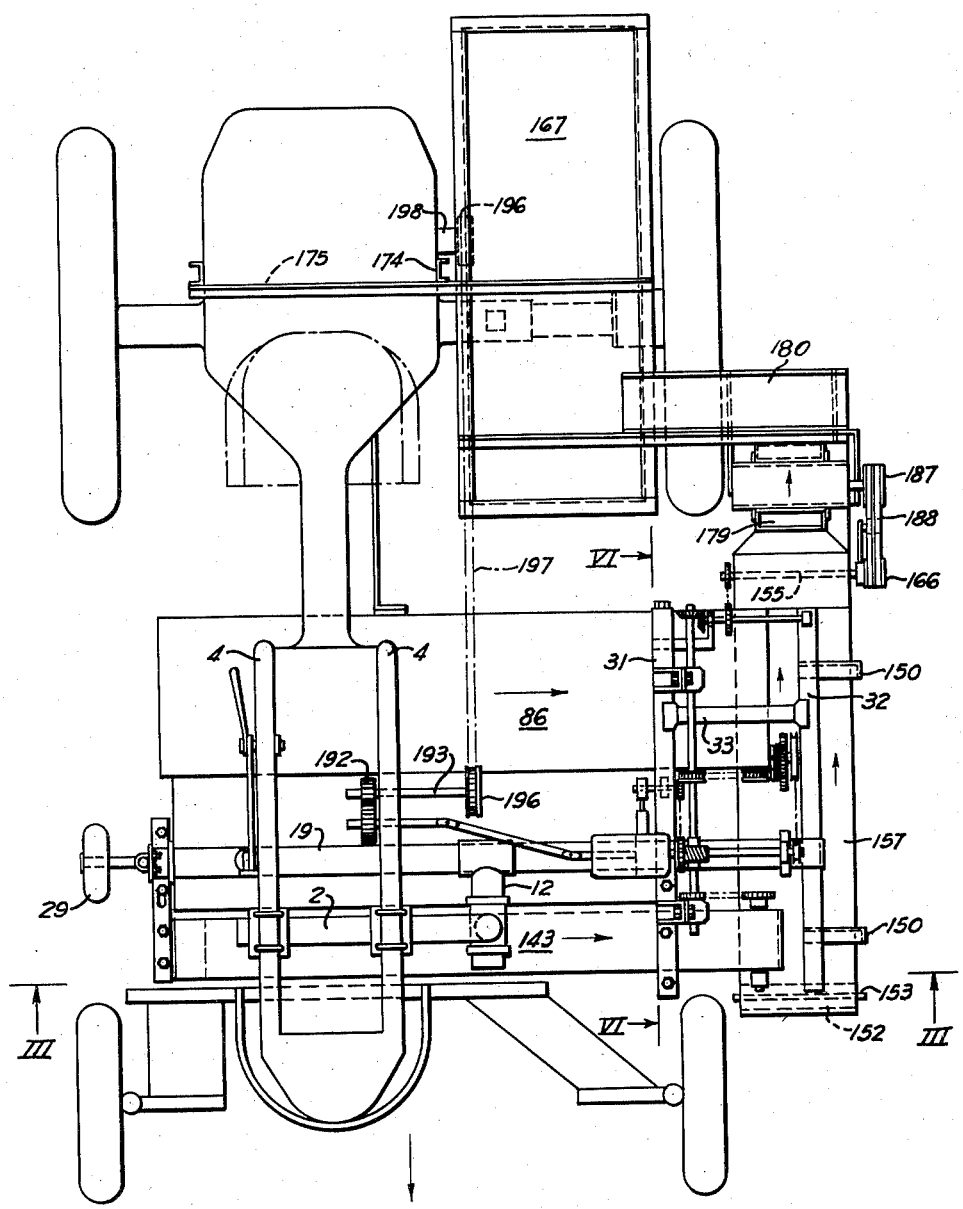
Fig. 1 shows a plan view of the harvester.

The machine contemplated by my invention comprises a supporting vehicle, such as a more or less conventional farm tractor which may not only propel itself but provide power for operating the picking machine. A sub-frame attached to the vehicle provides a support for the various picking, vine handling and cucumber conveying and collecting elements of the machine. The vine lifting and picking mechanism comprises a cluster of rolls or roll guided elements, such as belts which are open at one end and inclined upwardly from the open end. The growing vines are first engaged near the root ends by this roll cluster, or roll and belt cluster, and elevated, the lifting progressing toward the free end of the vine due to the inclination of the cluster of picking rolls or roll-like elements upwardly from the open end. After the vine is elevated it is carried in an inclined position toward the rear of the vehicle. Since the fruit which is large enough to pick may be moving vertically while the vine is moving rearwardly, the stem is tensioned at right angles to the fruit and the fruit detached from the vine. A further element of the machine is a vine shaking and arranging conveyor which straightens the vines out transverse to the direction of travel of the vehicle to be laid back on the ground while the shaking dislodges picked cucumbers that may be enmeshed in the vines. A conveyor system collects the plucked fruit and delivers it to a bin or hopper on the machine, while a power drive correlates all of the various functions to the forward travel of the vehicle so that the progressive picking up of the vines, picking of the cucumbers, straightening of the vines, and laying them back down does not uproot the vines or break them.

These mechanisms will be hereinafter described in this order, except that to some extent they are mutually involved with one another.

The traction unit

Any suitable means may be provided for moving the harvester longitudinally of the rows of cucumber vines and furnishing the motive power for the operation of the harvester. The harvester disclosed in the drawings for illustrating a preferred embodiment of the invention utilized a commercially available farm tractor to which a sub-structure of structural members was mounted upon the tractor frame members as hereinafter described. It will be obvious that any suitable traction and drive mechanism may be provided.

The sub-structure

Figure 4:
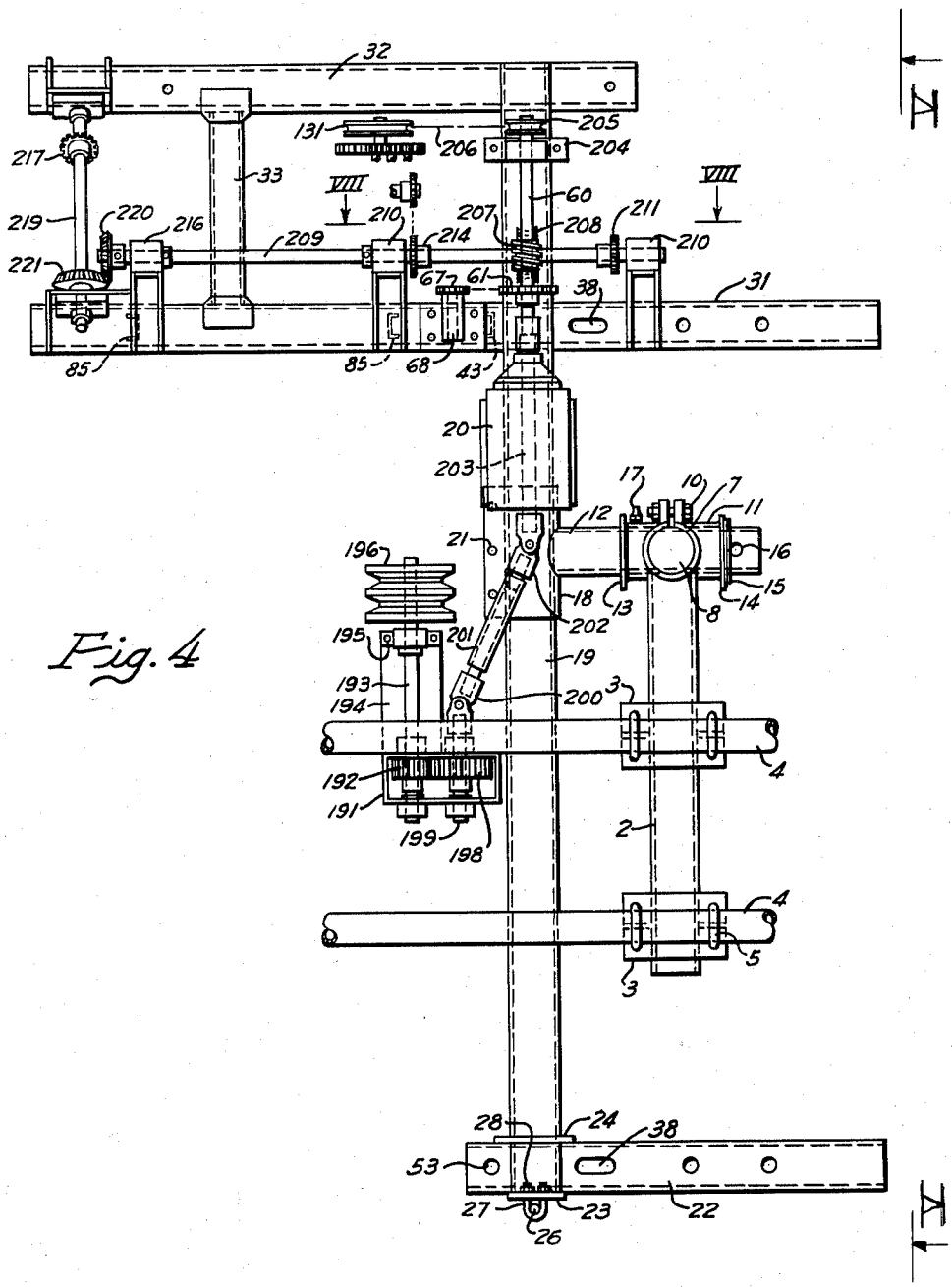
Fig. 4 shows an enlarged plan view of the sub-structure of the harvester providing support for the picking and collecting mechanism.

The sub-structure comprises the member 2 which may be a standard pipe section having the plates 3 secured to the upper surface thereof as by welding and mounted on the tractor frame members 4 by means of the U-bolts 5 and nuts 6 as shown in Figs. 4 and 5. Suitably secured to one end of the member 2 is a split clamp 7 for receiving the stem member 8 which is adjustably mounted in the split clamp and provided with a safety collar 9 suitably secured to the member 8 and bearing upon the upper end of the split clamp 7. The split clamp is secured to the member 8 by means of the clamping bolts 10. At the bottom of the stem member 8 is secured a sleeve member 11 through which extends a shaft 12 for rotary movement therein. A collar 13 on the shaft 12 limits longitudinal movement between the shaft and sleeve in one direction and a collar 14 mounted on the opposite end of the sleeve acts through washer members 15 mounted on the shaft and a cotter pin 16 to limit relative longitudinal movement between the shaft and sleeve in the opposite direction. Preferably an Alemite fitting 17 extends through the sleeve 11 providing lubricant to the shaft rotating within the sleeve. At one end of the shaft 12 and secured thereto by any suitable means as by welding, is a split clamp 18 through which extends the main cross member 19 which may also be a pipe or any other suitable structural member, and is preferably located at the center line of the transmission unit 20 for driving the picking mechanism and cucumber conveyors. The clamp 18 connecting the member 19 with the shaft 12 is provided with suitable bolts 21 for securing the clamp to the member 19 and permits adjustment of the member 19 transversely of the tractor so as to balance the mechanism hereinafter described and mounted on the sub-structure. Beneath one end of the member 19 is a member 22 extending longitudinally of the harvester providing support for the outer end of the primary roll and the front conveyor. This member 22 may comprise a structural channel having its web suitably secured to the member 19 as by welding and having the collars 23 and 24 at opposite sides of the member 22 mounted on the transverse member 19 and securing the channel and pipe together in any suitable manner as by welding. Outwardly of the adjacent end of the transverse member 19 is mounted sheath member 25 through which extends the shaft 26 and is secured in position by means of the U-bolt 27 having nuts 28 connecting it to the adjacent member 23. The lower end of the shaft 26 is deflected outwardly and has mounted thereon the wheel 29 suitably secured in position by nut 30. Mounted beneath the member 19 intermediate the ends thereof and secured thereto as by welding is the member 31 extending longitudinally of the harvester and providing a support for the ends of the primary and secondary rolls. At the outer end of the member 19, disposed beneath the same and extending longitudinally of the harvester, is a channel member 32 secured to the member 19 as by welding and reinforced by the member 33 welded to the members 19 and 32.

Figure 3:
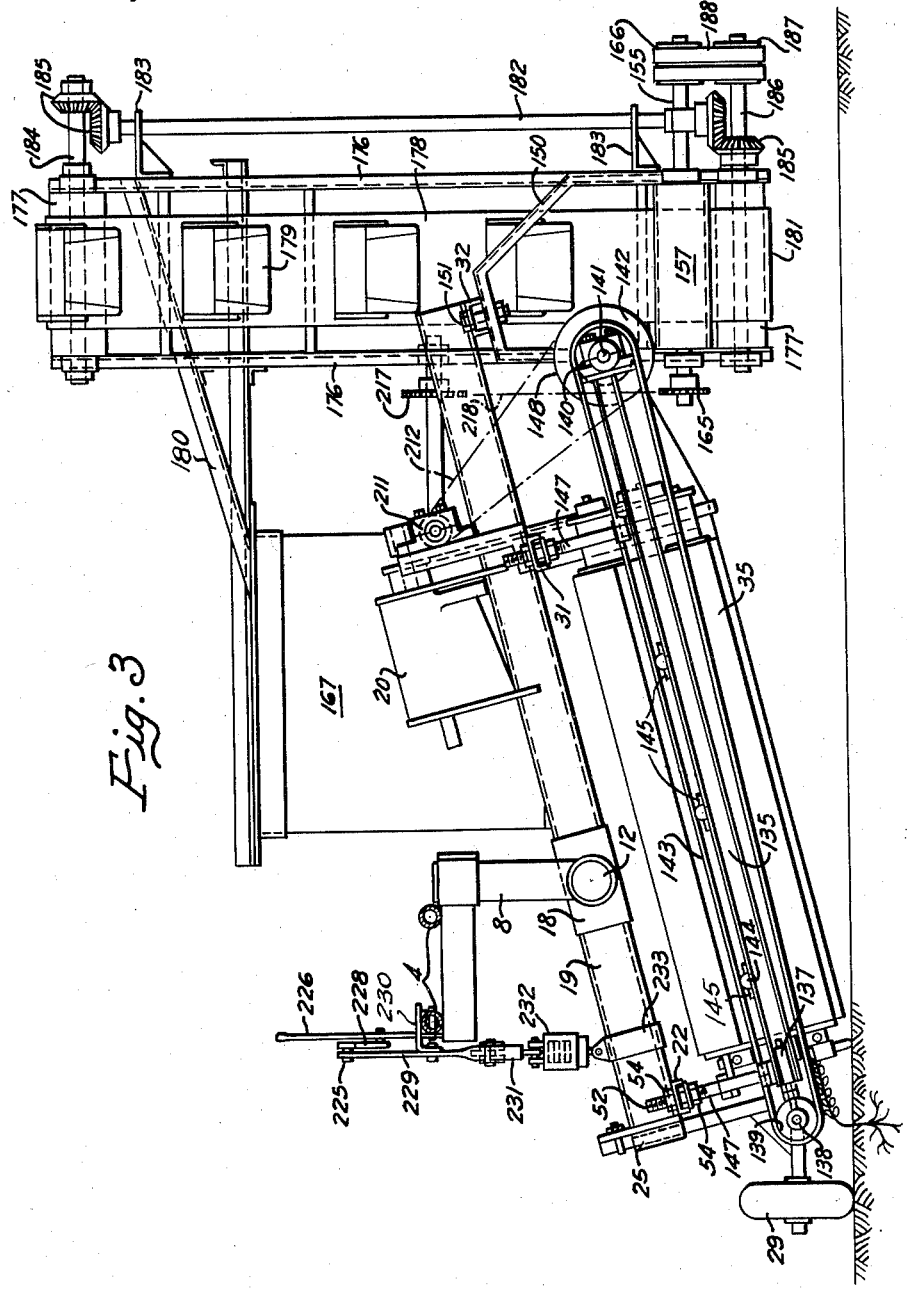
Fig. 3 shows an end elevation taken on line III—III of Fig. 1.

The sub-structure member 19 and associated members 22, 31 and 32 may be pivoted about member 12 to lower the primary and secondary rolls into picking position, or to raise them above the ground when the tractor is turning or moving between fields. This raising and lowering is accomplished by means of the device indicated generally by reference character 225. This device comprises an operating lever 226 pivotally mounted at one end 227 to tractor frame member 4 and connected by link 228 to lever 229 mounted on the member 4 by bracket 230. The lower end of lever 229 has a link 231 connected thereto and to clevis 232 which in turn is connected by strap 233 to member 19. When lever 226 is pulled back or pushed forward, as shown in Fig. 3, it acts to raise substructure member 19 and associated rolls.

Vine lifting and picking mechanism

The vine lifting and cucumber picking mechanism, Figs. 6 to 10 inclusive, is comprised of a cluster of cooperating elements, one or all of which may be rolls or belts guided over rollers, and which function much as did circular rolls used by me in my original experiments, but which in the case of belts provide greater area of contact with the vine. Therefore, whether such elements are rolls in a specific sense, or belts moving over rollers, I shall designate these elements as rolls. This cluster of rolls is comprised of a primary roll, the axis of which extends crosswise of the direction of travel of the tractor and is inclined. The primary roll is a cylindrical member having a shaft 34 enclosed by a thick, soft rubber coating 35 which may advantageously be made from foam rubber. This primary roll is suspended from the sub-structure members 22 and 31 by means of the hangers 36 which are provided with threaded end portions 37 engaging within the slotted openings 38 of the sub-structure members 22 and 31 so as to be adjustable relative thereto. When the primary roll is positioned as shown in Fig. 3 of the drawings, the lower end of the roll adjacent the root line is spaced from ½" to 2" from the ground for a purpose hereinafter set forth. The lower end of each hanger 36 is provided with a circular portion 39 engaging the shaft 34, and is preferably provided with a roller bearing upon which the shaft turns.

Mounted rearwardly of the primary roll with respect to forward movement of the harvester and forming part of the roll cluster, are vertically spaced secondary rolls hereinafter referred to as upper and lower secondary rolls, and which are in vertically opposed relation to one another, and which are in confronting relation to the rear surface of the primary roll, being sloped crosswise of the machine at the same angle as the primary roll. Each secondary roll is here shown as a belt passing over supporting rollers so that in transverse section each is substantially a rectangle comprising a relatively thick rubber continuous outer cover or belt 40 moving about the cylindrical roller 41 at one side of the roll, and about the three triangularly arranged rollers 42a, 42b and 42c, at the opposite side of the roll. The rubber covering of the secondary rolls is preferably not as soft as that of the primary roll. As shown in Fig. 6 of the drawings, the lower face of each secondary roll is preferably substantially horizontal, and the upper face of the secondary roll preferably slopes downwardly in a direction rearwardly of the harvester so that each secondary roll presents a substantially vertical face adjacent the primary roll and the opening between the upper and lower secondary rolls increases from the front to the rear of the secondary rolls.

The secondary roll assembly extends transversely of the harvester substantially parallel to the primary roll. The respective upper and lower secondary rolls are mounted upon supporting members of substantially the same length disposed transversely of the harvester in substantially parallel relation with the primary roll and may comprise the T-bars 46 and 47. The inner end of the T-bar 46 is adjustably mounted upon the sub-assembly member 43 depending from the member 31 by means of bolts 48 extending through openings in the T-bar and a slotted opening 49 in the member 43. The outer end of the T-bar 46 has a member 50 secured thereto and a member 51 extending outwardly from the member 50 in substantial alignment with the T-bar. The outer end of the T-bar is supported from the sub-frame member 22 by means of a hanger 52 secured to the member 51 and extending through an opening 53 in the member 22. The hanger 52 has its free end threaded and secured within the sub-assembly member 22 by means of the nuts 54. The lower T-bar 47 is likewise mounted on the sub-frame member 43. The T-bar 47 is preferably secured in fixed relation to the member 43 as by bolts or welding and has no outer support, since the vines must pass freely between the upper and lower secondary rolls at the outer ends thereof.

Mounted on each T-bar 46 and 47 and spaced longitudinally thereof are a plurality of plate-like members 45. The member 47 has the plates thereof in substantial alignment with the similar plates on the member 46, excepting that the plate 45 at the outer end of the member 47 is in substantial alignment with the plate 50 of the member 46. Each of the plates 45 and 50 have triangularly arranged openings therethrough in which are mounted the shafts 44 of the rollers 42a, 42b, and 42c, said rollers being sectional and disposed between the plates 45. As shown in Figs. 6 and 9 of the drawings, the plates 45 of the respective upper and lower T-bars 46 and 47 are reversed so that the rubber cover 40 at the opposing faces of the rolls is supported by two of the rollers 42a and 42b and the vertical faces of the secondary rolls opposing the primary roll are supported by two of the rollers 42b and 42c. Adjacent each end of the T-bars 46 and 47 is mounted a tubular member 56 secured to the respective adjacent plates 45 and 50. The rear rollers 41 of the secondary roll assembly are mounted on shafts 57 journaled at each end in roller bearings mounted in one end of a hanger 58 whose opposite end is adjustably mounted in the member 56 at each end of the T-bars 46 and 47. The T-bar 47 of the lower secondary roll has a vertically disposed sleeve 59 secured to the member 56 at the outer end thereof for support of a rear conveyor drag rod as hereinafter set forth.

The drive for the primary and secondary rolls as shown in Figs. 4 and 8 comprises the shaft 60 of transmission unit 20 having a chain sprocket 61 thereon, chain sprocket 62 mounted on shaft 34 of the primary roll, chain sprocket 63 and spur gear 64 mounted on the shaft 57 of the upper secondary roll, the spur gear 65 mounted on shaft 57 of the lower secondary roll and the chain 66 trained about said sprockets 61, 62 and 63. Slack in chain 66 resulting from normal wear or adjustments of the primary roll 35 or upper secondary roll 40 may be taken up by the idler sprocket 67 adjustably mounted on the sub-structure member 31 by means of bearing bracket 68 secured to member 31 by any suitable means such as bolts 69 engaged in slotted holes formed in member 31.

The cluster of rolls provides a vertical pass between the rear face of the primary roll and the front face of the lower secondary roll in which the vine with attached fruit is lifted, the lifting progressing, as hereinafter more fully described, from near the root end of the vine toward the free end because of the transverse inclination of the rolls. A horizontal pass for the vines is provided between the confronting faces of the two secondary rolls, so that after the vines are lifted they have a relative rearward movement between the secondary rolls. As this change of direction will take place more readily for the thin vine than it will for the elongated cucumber, it is largely through this that the stem is pulled at right angles to the fruit and the cucumber detached, as hereinafter more fully explained.

Vine shaking and conveying mechanism

Mounted on the harvester rearwardly of the bottom secondary roll and immediately adjacent thereto for receiving the cucumber vines passing between the secondary rolls is a vine shaking and straightening device mounted above a transversely moving rear conveyor. The vine shaking device is comprised of a series of parallel spiral or helical elements 70 mounted to rotate eccentrically of their axes and extending in a fore-and-aft direction. These elements have straight eccentric ends which, as shown in Fig. 11, are carried in bearings 71 and 71a on the side members of the rear conveyor, as shown in Figs. 9 and 11 to 16.

The rear conveyor indicated generally by reference character 73 includes side members 74 connected at their outer ends by the conveyor roll 75 whose shaft 76 is journaled in adjustable pillow blocks 77 mounted on the top flange of members 74. The bottom flange of the members 74, beneath the pillow blocks, is notched at 78 to receive the conveyor drag rod 79 disposed between the member 74 and the ground. This drag rod, as shown in Figs. 7 and 9, has an inner angular portion 80 provided with a depending flange portion 81 engaged within member 59 secured to T-bar member 47 of the lower secondary roll. The inner ends of the bottom conveyor 73 are connected by the driving roll 82 mounted on shaft 83 journaled in the members 84 secured to the conveyor side member 74. The inner end of conveyor 73 is suspended from the sub-structure member 31 by hanger members 85 and 85a, Figs. 6 and 12, connected to the members 74 and to the member 31. A conveyor belt 86 is trained over conveyor rolls 75 and 82. The upper surface of belt 86 intermediate the rolls 75 and 82 is supported on rolls 87 journaled in bearings 88 mounted on the members 74. The under side of belt 86 engages rolls 89 journaled in bearings 90 mounted on the members 74.

The relation of the vine shaking spirals 70 to the rear conveyor 73 is best shown in Figs. 2, 11, 12 and 13 of the drawings. In Fig. 11, showing the intermediate portion of the conveyor broken away, the spirals 70 are spaced inwardly from the lower end of conveyor 73 and spaced at intervals crosswise above the conveyor a sufficient distance to receive and shake the maximum expected length of the cucumber vine during the growing season. As above indicated, the eccentric straight ends of the spirals are mounted in bearings 71 and 71a. Bearings 71 are secured to a supporting member 91 attached to the adjacent conveyor channel 74. Bearings 71a are secured to bracket 92 attached to the adjacent conveyor channel 74. The end portion 93 of spiral 70 terminates within its associated bearing 71 and spiral end portion 94 extends through bearing 71a. The extended portions 94 have driving chain sprockets 95 mounted thereon. Spiral 70a is similar in all respects to spirals 70 excepting it has a helical gear 96 mounted on the straight end portion in front of its bearing 71a, this gear driving shaft 132 to be hereinafter described.

The spirals are driven in unison by gear 97 mounted on conveyor shaft 83 acting through gears 98 and 99 to drive chain sprocket 100. A chain 101 is trained over sprocket 100 and spiral sprockets 95. Above chain 101 and adjacent sprocket 100 is an idler sprocket 223 maintaining chain 101 in contact with sprockets 95. Beneath chain 101 and between the sprockets 95 are idler sprockets 102 supported on shafts 103 journaled in bearing brackets 104 secured to the adjacent conveyor channel 74. The gears 98 and 99 are mounted on shafts journaled in a U-shaped bracket 105 secured to the adjacent conveyor channel 74. The bracket 105 is comprised of an inner wall 106 adjacent channel 74, an outer wall 107 and a connecting bottom wall 108 extending to the web of channel 74 and connected thereto. Disposed between the walls 106 and 107 is an L-shaped member having one arm 109 extending in parallel spaced relation to wall 107 and an arm 110 connected to the wall 107. Bearing members 111 and 112 are mounted on walls 106 and 107. The shaft 113 of gear 98 is journaled in members 109 and 112, and the shaft 114 of gear 99 and sprocket 100 is journaled in bearing members 111 and 112. A guard 222 is shown in Fig. 9 and by dotted lines on Fig. 12, to carry the vines from rolls 117 over chain 101. Such guard may be mounted on the top flange of conveyor channel 74 and connected to the conveyor hanger member 85.

As best shown in Figs. 9 and 11 to 15 the cucumber vines are carried onto and away from the shaker spirals 70 by rollers 116 and 117 extending longitudinally of the conveyor. The rollers 116 have shafts 115 journaled in bearings 118 mounted on bracket 119 secured to the outer end of conveyor channel 74. At the inner end of the conveyor the shafts 115 are journaled in bearing 120 mounted on bracket 121 secured to the end of the conveyor channel 74. The bracket 121 comprises a bottom plate 122 extending inwardly beneath channel 74 and secured thereto by members 123. Adjacent the outer end of plate 122 is an upwardly-extending plate 124 having a boss 125 thereon, both bored and having a bushing to receive shaft 126. Plate 124 is reinforced by plate 127 secured thereto and to plate 122. Intermediate the ends of plate 122 is an upwardly-extending member 128 having bearing 120 mounted thereon and both bored to receive shafts 115. Shafts 115 extend through member 128 and have gears 129 mounted thereon meshing with gear 130 disposed between plate 124 and member 128 and mounted on shaft 126. At the outer end of shaft 126 is mounted pulley 131 which drives the rolls 116.

The rolls 117 at the rear side of the vine shaker carry the vines away from the shaker spirals 70 and deposit the vines upon the ground. These rolls are in sections disposed between the vine shaker spirals 70 and are provided with a common shaft 132 journaled in bearings 133 mounted on brackets 92. At the bracket 92a the bearings 133a are spaced and a helical gear 134 mounted on shaft 132. Gear 134 meshes with the adjacent gear 96 mounted on the adjacent spiral 70a and the shaft 132 is driven therefrom.

When the vines pass from between the upper and lower secondary rolls, they are transferred by rolls 116 to the spirals into the convolutions of which the vines fall and by the operation of which they are straightened out, and gently pulled as they are conveyed by the screw action of the spirals toward the rear of the machine. Since the spirals revolve eccentrically about their axes, the vines are also raised and lowered to shake out cucumbers which have been detached but are entangled with the vines and leaves.

*Conveying and collecting mechanism*

As will hereinafter become more apparent, some of the cucumbers which are picked move rearwardly with the vines, while others are carried forwardly over the top of the primary roll. Consequently the machine embodies a second or front conveyor substantially parallel with the rear one.

Forwardly of the primary roll 35 and extending transversely of the harvester is a front conveyor for receiving cucumbers separated from the vines and ejected forwardly of the primary roll. As best shown in Figs 1, 3 and 6, this conveyor comprises spaced side channels 135 and 136 having mounted at their outer ends adjustable bearings 137 within which is journaled the shaft 138 having the roll 139 thereon and disposed between the channels. At the opposite or inner ends of the channels are mounted the bearings 140 within which is journaled the shaft 141 having the roll 142 thereon. An endless conveyor belt 143 is threaded over rolls 139 and 142 and is supported intermediate its ends upon the rollers 144 journaled in suitable bearings 145 mounted on the channels 135 and 136. The channels are adjustably suspended from the sub-frame members 22 and 31 by means of the hanger rods 146 and 147 secured to channels 135 and 136. One end of the shaft 141 for the conveyor belt supporting roller 142 extends through its bearing 140 and has mounted on such extension a sprocket 148 for driving the conveyor belt 143.

At one side of the harvester and opposite the root line of the vines being processed by the harvester is mounted a side conveyor extending longitudinally of the harvester and onto which the aforementioned front and rear conveyors discharge their contents. This side conveyor, as best shown in Figs. 1, 3 and 19, comprises longitudinally-extending side members such as the channels 149 suspended from the sub-structure member 32 by means of the hanger 150 connected to the sub-structure member by any suitable means such as the bolts 151. At the forward end of the conveyor and between the channels 149 is mounted the roller 152 upon shaft 153 journaled in suitable bearings preferably adjustably mounted on the conveyor. At the rearward end of the conveyor is mounted a roller 154 having a shaft 155 journaled in suitable bearings 156 secured to the ends of the conveyor frame members 149. A continuous belt member 157 is mounted on the rollers 152 and 154. At the rear end of the conveyor, adjacent belt roller 154, is mounted a chute 158 which receives the cucumbers from the conveyor belt 157 and discharges them onto the adjacent vertical conveyor. This chute comprises side portions 159 at each side of the conveyor belt and an inclined bottom portion 160 terminating in a flexible member 161. The chute is mounted upon the conveyor by means of suitable brace members such as 162 at each side of the conveyor and adjustably connected to a frame member 163 secured to the bottom of the chute. Preferably a vertically-extending guide plate 164 is mounted at the sides of the conveyor belt to retain the cucumbers as they move toward the chute. The belt is driven through the roller by means of an extension of one side of the roller shaft 155 upon which is mounted the chain driving sprocket 165 and at the opposite end of the shaft by means of the pulley 166.

Figure 2:
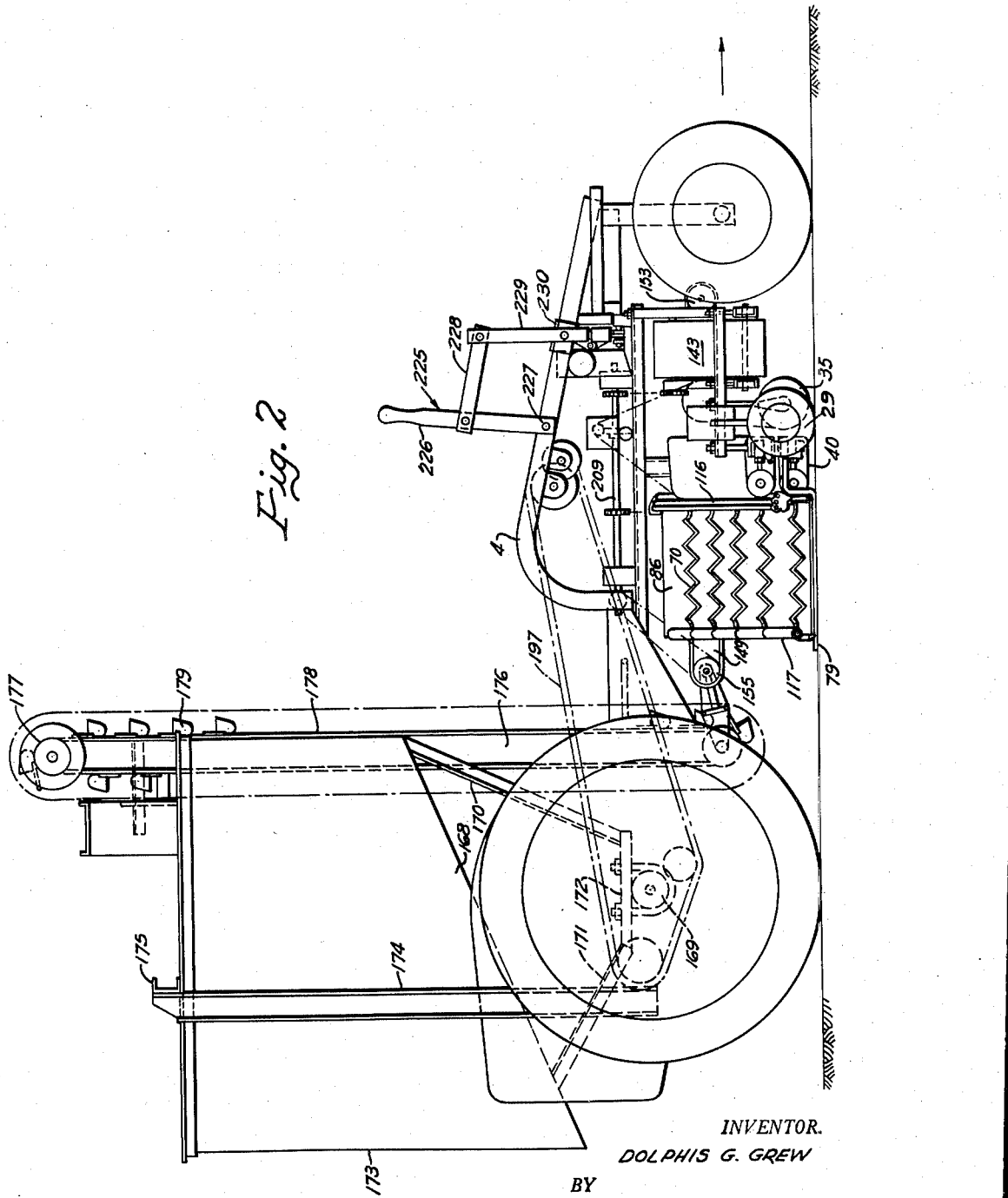
Fig. 2 shows a side elevation of the harvester in picking position.

Adjacent the end of the rear conveyor and spaced inwardly therefrom is a suitable hopper 167 for receiving the cucumbers from the side conveyor. This hopper may be of any suitable design and as shown in Figs. 1 to 3 of the drawings is substantially rectangular having a sloping bottom 168 which may be supported from any suitable portion of the tractor structure such as the rear axle 169 of the tractor by means of the substantially triangularly-shaped braces 170, 121 and 172 having the apex thereof resting on the rear axle and secured thereto by any suitable means. In the rear wall 173 of the hopper is mounted a suitable door for removing the cucumbers therefrom. The hopper may also be suitably braced such as by the members 174 extending upwardly from a suitable portion of the tractor structure and connected at their upper ends by means of the transversely-disposed member 175 secured to the members 174 and connected with the top of the hopper. At one side of the hopper 167 and disposed transversely of the end of the chute 158 of the side conveyor is a vertical conveyor frame comprised of the side members 176 supported from the brace member 175 extending outwardly across the hopper. At each end of the conveyor frame are mounted the rollers 177 over which is trained a suitable conveyor belt 178 having the buckets 179 mounted thereon, the buckets being so rotated as to receive the cucumbers from the side conveyor chute 158 and to discharge them into a suitable chute 180 which conveys them to the hopper 167. At the bottom of the conveyor is preferably mounted a suitable sheet metal guard 181 to protect the buckets at the bottom of the conveyor. The conveyor belt is driven by a vertical shaft 182 mounted at one side of the conveyor frame by means of the brackets 183. The upper end of the shaft 182 is connected with the shaft 184 on the upper roller 177 by any suitable means such as a pair of miter gears 185, and the shaft 186 of lower roller 177 is similarly connected so that both the rolls 177 are driven. The vertical shaft 182 is powered by a pulley 187 mounted on the extension of the shaft 186 of roller 177 and a similar pulley 166 mounted on the shaft 155 of the end conveyor. The pulleys 166 and 187 are driven by suitable belts 188 trained over them and preferably a suitable belt tensioning member such as 189 is connected to the belt between the pulleys and may be suspended from the shaft 155 of the side conveyor by means of any suitable arm such as 190.

Driving mechanism

In order to power the various conveyors and the primary and secondary rollers from the engine of the tractor, a gear box 191 may be mounted on the tractor frame structure such as the members 4, Fig. 4. Within the gear box is a driving gear 192 mounted on the shaft 193 which extends outwardly from the gear box through a suitable bearing 194 and supported upon a suitable bracket 195. A sheave such as the two groove V-belt sheaves 196 is mounted on the shaft 195 and connected by belt 197 with a similar pulley 196 on the tractor engine shaft 193. A driven gear 198 on shaft 199 is mounted within the gear box. An extension of shaft 199 from one side of the gear box is connected by means of a universal joint 200 to a splined telescoping shaft 201 having at its opposite end a second universal joint 202 connected with the shaft 203 of the transmission unit 20. A driving shaft 60 extends from the unit 20 and is journaled adjacent its outer end in bearing 204 mounted on the sub-frame member 19. The shaft 60 extends through bearing 204 and has a pulley 205 mounted on said extension. Pulley 205 is connected by belt 206 with pulley 131 on shaft 126 of the vine shaking device of Fig. 11. Mounted on shaft 60, intermediate the ends thereof, is worm 207 and sprocket 61. Worm 207 meshes with worm gear 208 mounted on shaft 209 journaled in pillow blocks 210 mounted on sub-frame member 31. The sprocket 61 of shaft 209 drives the primary and secondary rolls as in Fig. 8. Sprocket 211 is connected by a suitable chain 212 with sprocket 148 on the shaft 141 of the front conveyor, Fig. 3. Sprocket 214 of shaft 209 is connected by chain 215 with sprocket 216 of shaft 83 at the forward end of the rear conveyor. The side conveyor 149 is driven from sprocket 217 through chain 218 and sprocket 165 of shaft 155 on the conveyor. Sprocket 217 is mounted on shaft 219 journaled at its opposite ends on substructure members 31 and 32. Shaft 219 is driven through a pair of miter gears 220 and 221 mounted respectively on shafts 209 and 219.

Figure 20:
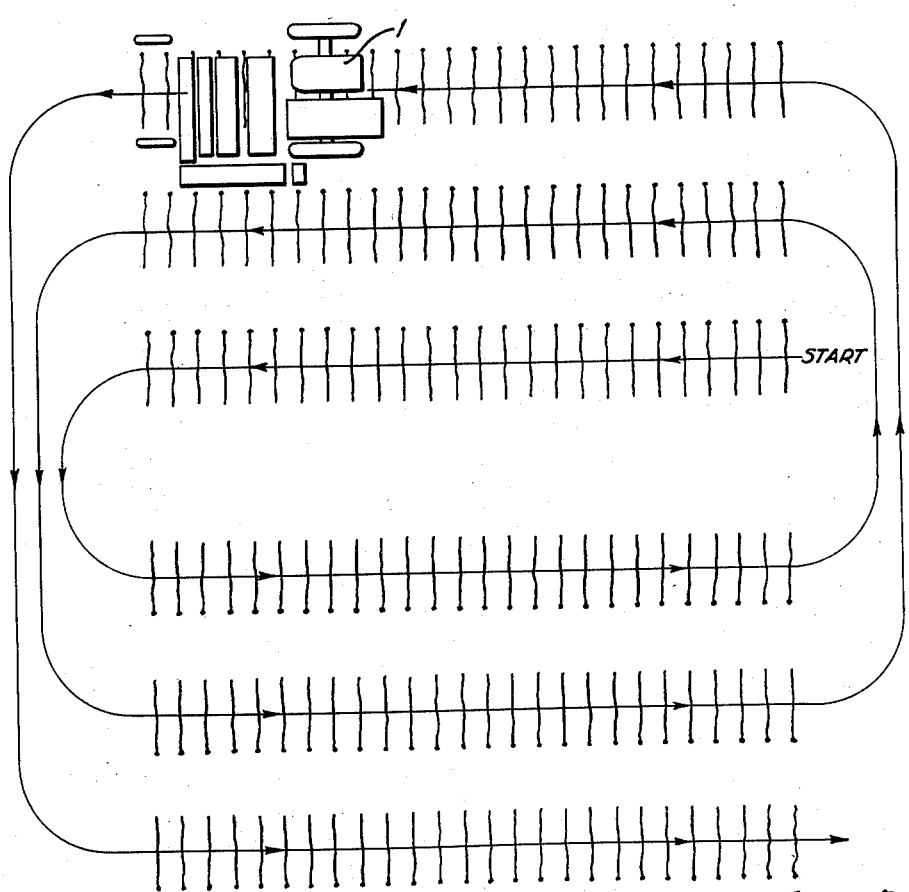
Fig. 20 shows a proposed vine planting plan.
Figure 10:
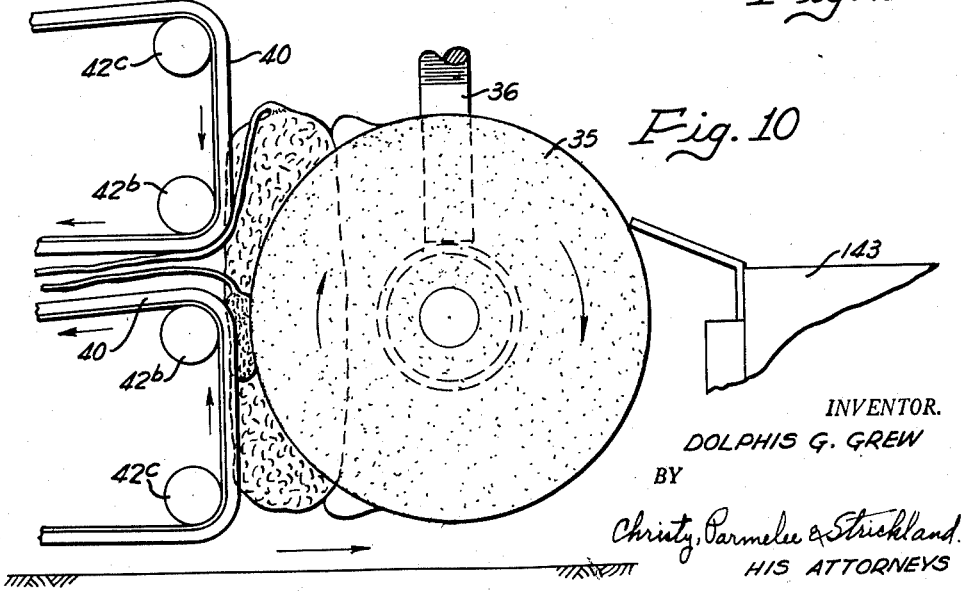
Fig. 10 shows an enlarged view of the vine lifting and stem severing mechanism.

As an aid to better understanding of the operation of the harvester, reference is made to Fig. 20 of the drawings showing quite schematically a preferred method of growing the cucumber vines in a field, and the manner of using the harvester in a field so planted. As shown therein the vines are planted in spaced rows longitudinally of the field and trained to grow transversely of the field. One half the rows of vines are trained to grow in one direction, and the remaining half in the opposite direction. After the vines have started to produce cucumbers of the desired size, the harvester is moved longitudinally of the rows of vines with the tractor wheels straddling the row of vines and the sub-structure suitably inclined so that the open end of the picking roll cluster assembly is disposed adjacent the ground and spaced about 4 inches from the root line. The wheel 29 at the side of the sub-structure frame when engaged with the ground supports the picking roll assembly of the harvester in picking position. This wheel trails the front wheel of the tractor, and all of the wheels at this side of the tractor travel along the line of the rows on the side opposite the one to which the vines are trained, while the tractor is wide enough so that the wheels on the opposite side of the machine travel in a corresponding position to the next row of vines, and the wheels do not pass over the vines.

General operation

The harvester moves longitudinally of the vine rows at a speed of about 2½ miles per hour with the primary roll spaced from about ½ to 2 inches above the ground. The bottom secondary roll is spaced about ½ inch above the ground and the spacing between the secondary rolls where the vines enter between them is preferably between ¾ inch to 1½ inches. The spacing between the adjacent faces of the primary roll and bottom secondary roll varies with the minimum sizes of cucumbers to be picked and will be ⅛ inch or greater. To provide for these adjustments the primary roll 35 is suspended from the sub-structure members 22 and 31 by means of the threaded hanger members 36 extending through slotted openings 38 in the sub-structure members. The upper secondary roll 40 is suspended from sub-structure member 43 by means of the bolts 48 extending through the roll T-bar 46 and slotted opening 49 in the sub-structure member 43. The spacing between the rolls, as hereinbefore discussed, is less when the vines are young or dry than when older or wet with dew or rain.

Referring now to Figs. 3 and 6 of the drawings, as the harvester moves longitudinally of the row of vines the primary and lower secondary rolls are rotating in opposite directions so that their opposing faces are moving upwardly with relation to the ground. As the primary roll 35 advances towards the vines, it presses them towards the ground so as to spring up behind the roll when released. The lower secondary roll 40 is advancing towards the released vines and the vines and leaves are caught between the opposed upwardly-moving faces of the primary and lower secondary roll. These rolls being transversely from the open end of the cluster, progressively lift the entire length of the vine from the ground and pass it upwardly between their opposing faces. The upper secondary roll 40 is rotating in a direction opposite to that of the lower secondary roll so that the upwardly-moving vine upon moving free of the primary roll is engaged in the space below the upper secondary roll and the top of the lower primary roll to be moved relatively in a rearward direction.

The natural habit of growth of the cucumber vine is for the stem to grow upward from the ground from four to eight inches and then turn over and grow along the ground. The leaves which have fairly long stems grow upwardly from the vine towards the light and the cucumbers grow outwardly along the ground from the vine upon short stems so as to be disposed below and somewhat hidden by the leaves. As a consequence the leaves are first engaged by the opposing faces of the primary and lower secondary rolls in lifting the vine from the ground. As the vine is lifted the cucumbers tend to hang down, and it is in such stem upward position that they are engaged between the rolls. The vine and its leaves are engaged between the opposing faces of the upper and lower secondary rolls and move rearwardly of the harvester before cucumbers of harvesting size have cleared engagement between the opposing faces of the primary and lower secondary roll. Then the cucumber may be still held and be moving vertically upward while the vine is being pulled horizontally to the rear so that the cucumber stem is pulled sharply in a direction transversely of the axes of movement of the cucumber and severs the stem from the cucumber. Cucumbers of different diameters compress the roll surfaces to different extents, but the roll surfaces are resilient enough to accommodate all usable sizes. After the cucumber is detached from the vine and passes from between the primary and lower secondary roll it may move forwardly of the primary roll to fall onto the front conveyor 143, or be carried between the secondary rolls by the following vines. Very small cucumber sets and blossoms are not disturbed or impaired by this operation and remain attached to the vine. Oversize cucumbers will be picked to avoid their being left on the vine, and if too large, may be broken in the picking operation so as to avoid their being used.

The driving gear is so arranged that the passing of the vines between the secondary rolls rearwardly of the moving harvester is at a rate substantially equal to the forward movement of the harvester so that its position relative to the ground changes very little and the vine is not pulled out of the ground during the foregoing operation, nor do the vines tend to seriously twist during passage between the secondary rolls. As the vines pass from between the secondary rolls they fall upon the rolls 115 which preferably have a surface speed slightly greater than that of the harvester so that the vines are advanced on to the shaker. Here the vines are engaged by the convolutions of the rotating spiral members 70 which extend longitudinally of the path of travel of the tractor, and their direction of rotation is such as to move the vines rearwardly of the tractor with a screw-like action. These spiral members 70 having their ends eccentrically mounted relative to the center line of the member impart a tossing or vertically undulating movement to the vines passing over them and thus separate the vines, tending to straighten them lengthwise and serving to dislodge entangled picked cucumbers. Any cucumbers severed from the vines and carried with them to the shaker table fall free of the vines and drop onto the transverse rear conveyor disposed beneath the table. At the rear side of the shaker table the vines pass from the table over roll 117 and guard, Fig. 9, so as to be deposited upon the ground in a generally orderly position for the next picking and in good growing condition.

As best shown in Figs. 1, 3 and 6 the cucumbers are collected and deposited in a suitable receptacle or hopper 167 at the rear of the harvester. Many of the cucumbers after being severed from the vine pass over primary roll 35 and are deposited upon front conveyor 143 moving transversely of the harvester. The remaining cucumbers fall upon the succeeding vines and are carried through the secondary rolls 40 on to the shaker spirals 70. The shaking action imparted to the vines cause the severed cucumbers thereon to fall through the spirals 70 and onto the rear conveyor 86 moving in the same direction as front conveyor 143. The cucumbers are discharged from these conveyors 86 and 143 upon a side conveyor or belt 157 extending longitudinally of the harvester and moving rearwardly thereof. As shown in Fig. 19, the accumulated cucumbers are retained on conveyor belt 157 by guards 164 until they pass off the belt into chute 158 and are discharged into the elevator boots 179. A flexible member 161 secured to chute 158 overlaps the rising boots 179 to direct the cucumbers into the boot. The boots 179 discharge their contents into chute 180 from which they pass into hopper 173.

A modified form of primary roll is shown in Fig. 21 of the drawings wherein the roll body 224 is substantially elliptical and is suspended from sub-frame members 22 and 31 by hangers 36a. The body portion 224 is mounted on a suitable belt 225 trained over rolls 226, 227 and 228. These rolls may be supported by a T-bar 229 and hanger 230 similar to that described in detail for secondary rolls 40. With such type of construction a softer roll surface may be provided so that the smallest and largest cucumber may be accommodated without bruising. This modified form of primary roll may be used with the present secondary rolls 40 as shown.

This application is a continuation-in-part of my co-pending applications Serial No. 288,909, filed May 20, 1952, and now abandoned, and Serial No. 381,243, filed September 21, 1953, and also now abandoned.

The presently preferred form of the invention has been shown and described. Many modifications in details of construction will suggest themselves to those skilled in the art and may be adopted without departing from the invention disclosed. It is to be understood, therefore, that the details of construction hereinbefore shown and described were for purposes of illustration and not limitation except as made necessary by the scope of the appended claims.

I claim:

1. Apparatus for successive harvesting of maturing cucumbers from spaced rows of vines during the growing season and returning the vines to the ground in condition for further growth and production of cucumbers comprising in combination wheeled frame means for movement longitudinally of a row of vines in straddling relation thereto; means carried by the frame means for progressively lifting a vine throughout the length thereof above the ground from adjacent the root thereof so that maturing cucumbers depend therefrom and resiliently engaging the maturing cucumbers depending therefrom; means carried by the frame means for imparting lateral movement to the vine relative to the cucumbers depending therefrom in engagement with the vine lifting means for severing the cucumbers from the vine; means connected to the frame means for collecting the severed cucumbers; and means carried by the frame means for returning the vines to the ground in condition for further growth, said means for collecting the severed cucumbers including a conveyor suspended from the wheeled frame means and disposed in front of the vine lifting means in substantially parallel relation thereto, a conveyor suspended from the wheeled frame means and disposed to the rear of the vine lifting means in substantially parallel relation thereto, and a third conveyor suspended from the wheeled frame means and disposed transversely of the first named conveyors in a position to receive cucumbers therefrom.

2. Apparatus as defined in claim 1 including vine shaking means supported on said wheeled frame means above the said rear conveyor for receiving the vines from the vine lifting means and shaking said vines above said rear conveyor.

3. In a harvesting apparatus of the character described, in combination, a frame, a pair of horizontally spaced, oppositely rotatable members mounted on said frame operable to grip a vine therebetween, said members being sloped upwardly from corresponding ends, a rotatable vine turning member mounted on said frame in vertically spaced opposing relation to one of the horizontally spaced members operable to receive a vine from said spaced members and change its direction of movement, means spaced to one side of the vertically spaced members and mounted on said frame for receiving the vine issuing beneath the vine turning member and depositing the vine upon the ground in position for further growth.

4. Apparatus as defined in claim 3 wherein the means comprises a plurality of rotatable spiral shaped members spaced longitudinally of the vertically spaced members and rotating about axes substantially normal to the latter members, and rotating members at each end of the spirals carrying the processed vines onto and away from said spirals.

5. Apparatus as defined in claim 4 wherein means is carried by said frame beneath said spirals for receiving cucumbers falling from the vines moving upon the spirals.

6. Apparatus as defined in claim 3 wherein one of the horizontally spaced opposing members is horizontally and vertically adjustable relative to the other member and is provided with a readily yieldable outer surface so as to freely pass cucumbers of greater diameter than the spacing between the opposing members.

7. Apparatus for successively harvesting maturing cucumbers from spaced rows of vines throughout the growing season and returning the vines to the ground for further growth and production of cucumbers, comprising, a wheeled frame for movement longitudinally of a row of vines in straddled relation thereto, a hopper on said frame, a rotatable primary roll carried by said frame and extending transversely of the frame and inclined upwardly from one end, said one end of said primary roll being positionable adjacent the root line of the row of vines, a rotatable vine lifting secondary roll carried by the frame in spaced opposing substantially parallel relation to the primary roll so that the vines are engaged between the opposing faces of the rolls adjacent the vine root line and progressively lifted above the ground throughout their length, a rotatable vine turning secondary roll carried by the frame in vertically spaced substantially parallel opposing relation to the vine lifting roll, the relation of the vine turning roll to the primary roll being such as to carry the vine transversely of the lower secondary roll while the cucumbers depending from the lifted vine are engaged between the opposing faces of the vine lifting and primary rolls, means on said frame for receiving the vines from between the secondary rolls and returning them to the ground in position for further growth, means on said frame at opposite sides of the opposing primary and secondary rolls for collecting cucumbers severed from the vines while passing between the secondary rolls, and means on said frame for receiving the cucumbers from the collecting means and carrying them longitudinally of the harvester to said hopper.

8. Apparatus for harvesting cucumbers from growing vines having rooted ends and free ends, said apparatus comprising a mobile frame, an inclined cluster of roll-like elements extending transversely of said frame and being spaced to grip the free ends of the vines therebetween while the rooted ends remain rooted in the ground, said cluster comprising a primary element having a run which moves vertically, a lower secondary element having a run which moves vertically in confronting vine engaging and elevating relation to the said run of the primary element said lower second element having a second run which moves rearwardly away from the primary element, and an upper secondary element having a downwardly moving run confronting the primary element and a rearwardly movable run in confronting vine engaging relation to the second run of the lower secondary element.

9. Apparatus for successive picking of cucumbers from spaced rows of parallel growing vines during the growing season by raising the vine to cause the cucumbers to depend therefrom, severing them from the vine and returning the vine to the ground for further growth comprising, a steerable wheeled frame for movement longitudinally of the rows of vines so as to straddle the growing vines, a cylindrical member mounted on the frame extending substantially parallel to the direction of growth of the vine from adjacent the root of the straddled vine, an endless belt member mounted on the frame adjacent to and parallel with the cylindrical member providing a vertically disposed portion extending upwardly from adjacent the root of the vine and a rearwardly inclined portion extending towards the ground, and means connected to said members for rotating both members so that a vine disposed between them is progressively lifted vertically upward from the ground by the vertical face of the belt and then rearwardly and downwardly by the inclined portion of the belt for deposition upon the ground in growing direction.

10. Apparatus for successive picking of cucumbers from growing vines by mechanically lifting the vines from the ground then removing the cucumbers therefrom and replacing the vines on the ground in condition for further growing and production of cucumbers, comprising a wheeled frame, an elongated endless belt mounted on the frame and extending from adjacent the root portion of the vine having a substantially vertical vine lifting portion and a rearwardly extending downwardly inclined vine replacing portion, a similarly disposed opposing roll member mounted on the frame and having a soft compressible outer peripheral portion spaced from the lifting portion of the belt a distance substantially equal to the diameter of the smallest cucumber to be picked so as to retain the cucumber in contact with the belt and roll as the vine from which the cucumber depends moves onto the vine replacing portion of the belt, a vine turning belt mounted on the frame and overlying the rearwardly inclined portion of the endless belt in substantially coextensive relationship therewith to guide the vine towards the ground in growing position, drive means connected to said roll and to said belts for rotating the roll and belts, and a member associated with the roll for receiving the cucumbers as they are removed from the vine.

11. Apparatus as in claim 10 in which the roll and belts are mounted on an adjustable frame for maintaining them in the desired relation to the ground which may be of varying contour.

12. Apparatus for successive picking of vegetables from growing vines and returning the vines to growing position for further growth of vine and vegetable during the growing season, comprising a wheeled frame for movement along a row of such vines and straddling the vines and vegetables to be picked therefrom, a member rotatably mounted on the frame and extending from adjacent the root of the vine in a direction of the growth of the vine for substantially the maximum growth length thereof, a second and similarly extending opposing member mounted on the frame in substantially horizontal spaced relation thereto for engaging the vine and vegetables growing thereon passing between said members, said second named member having a portion extending rearwardly of the frame for depositing the vine upon the ground after passing between the opposing members, a third member disposed substantially parallel to and overlying the rearwardly extending portion of the second member, means connected to said members for driving said members so as to lift a vine engaged therewith and pass the entire vine therethrough and return it to the ground, and a vegetable collector associated with the first named member for reception of vegetables severed from the vine during passage between the opposing members.

13. Apparatus as in claim 12 wherein the opposing members have resilient opposing face portions.

14. Apparatus as in claim 12 wherein the rearwardly extending portion of the second member is disposed relative to the bight between the first two named members so as to be moving the vine rearwardly of the frame while the vegetables depending therefrom are engaged by the opposing faces of the first and second members.

15. A cucumber picking machine for lifting the growing ends of the cucumber vine from the ground, separating the cucumbers from the vine and returning the vine to the ground for further growth, comprising a frame, wheels supporting the frame for movement longitudinally of a row of spaced cucumber vines growing transversely of the direction of movement of the frame, a vine gathering member rotatably mounted on the frame and disposed transversely of the frame so as to slope upwardly from adjacent the root ends of the row of vines with one end of the member disposed adjacent to the ground, a vine lifting member rotatably mounted on the frame in spaced opposing relation to the vine gathering member and extending substantially parallel thereto transversely of the frame, means for rotating said members so as to impart a lifting movement to the growing end of a vine initially engaged between them adjacent the root end of the vine and without dislodging the vine root end from the ground, a vine turning member rotatably mounted on the frame above said vine lifting member and extending substantially parallel thereto transversely of the frame, means for rotating said vine turning member so as to cooperate with the vine lifting member to receive the vine as it passes above the lifting member and carry the vine rearwardly of the vine lifting member and vehicle frame for return to the ground for further growing.

16. The cucumber picking machine as in claim 15 wherein each of the said vine engaging members is adjustably mounted on the frame of said machine for independent adjustment relative to its cooperating member.

17. The cucumber picking machine as in claim 15 wherein the frame is pivotally mounted for selectively raising the said vine handling member out of vine contacting position.

18. The cucumber picking machine as in claim 17 wherein the frame is supported in its lowermost inclined position relative to the ground by a rotatable member in engagement with the ground.

19. The cucumber picking machine as in claim 15 wherein the vine gathering member has a relatively soft and compressible outer face opposing the face of the vine lifting member permitting the spacing between the opposing faces of the members to be set to grip a minimum size cucumber passing between them and compressible so as to pass a maximum sized cucumber without damage thereto.

20. A cucumber harvesting machine for harvesting cucumbers from ground attached vines comprising a mobile frame having front and rear ends; and a vine lifting and cucumber picking means on said frame, said means comprising a plurality of elongated cooperating elements extending at an incline and transversely of said frame.

21. A machine as set forth in claim 20 including vine shaking means on said frame rearwardly of said elements.

22. A machine as set forth in claim 21 including conveyor means on said frame for receiving picked cucumbers.

23. A machine as set forth in claim 22 wherein said conveyor means is located both fore and aft of said elements.

24. A machine as set forth in claim 22 wherein said conveyor means includes a portion thereof located beneath said vine shaking means.

25. A machine as set forth in claim 20 wherein said cooperating elements are three in number.

26. A machine as set forth in claim 20 wherein each of said elements is formed of soft, yieldable, rubber-like material.

27. Apparatus for successively harvesting cucumbers throughout the growing season comprising mobile frame means adapted for movement alongside a row of growing vines each having an end rooted in the ground and a free end; vine lifting means supported by said frame means and positioned thereby initially to engage a vine above the ground intermediate the free and rooted ends of the vine to raise the unrooted portion of the vine together with its fruit; rotatable means supported by said frame means for effecting movement of said raised portion of said vine relative to its fruit to detach the latter from said portion of said vine and for returning said portion of said vine to the ground in condition for further growth; and driving means connected to said rotatable means for imparting rotation to the latter.

28. Apparatus as set forth in claim 27 including conveyor means supported on said frame means in a position to receive detached fruit.

29. Apparatus as set forth in claim 27 including vine shaking means carried by said frame means and located in the path of a vine being returned to the ground.

30. Apparatus as set forth in claim 29 wherein said conveyor means includes a portion located beneath said vine shaking means.

References Cited in the file of this patent

UNITED STATES PATENTS

| Number | Name | Date |
|---|---|---|
| 1,332,495 | Graham | Mar. 2, 1920 |
| 1,371,437 | Pringle | Mar. 15, 1921 |
| 1,537,824 | Hibbs | May 12, 1925 |
| 1,673,780 | Sargent | June 12, 1928 |
| 2,402,201 | Martin | June 18, 1946 |
| 2,522,644 | Searcy | Sept. 19, 1950 |
| 2,544,023 | Johnson | Mar. 6, 1951 |
| 2,544,025 | Johnson | Mar. 6, 1951 |
| 2,698,506 | Rushfeldt | Jan. 4, 1955 |
| 2,706,373 | Nisbet | Apr. 19, 1955 |